(12) United States Patent
Crutchfield

(10) Patent No.: US 7,333,243 B2
(45) Date of Patent: Feb. 19, 2008

(54) CALCULATING ERROR DIFFUSION ERRORS TO MINIMIZE MEMORY ACCESSES

(75) Inventor: David A. Crutchfield, Georgetown, KY (US)

(73) Assignee: Lexmark International, Inc, Lexington, KY (US)

( * ) Notice: Subject to any disclaimer, the term of this patent is extended or adjusted under 35 U.S.C. 154(b) by 846 days.

(21) Appl. No.: 10/738,311

(22) Filed: Dec. 17, 2003

(65) Prior Publication Data

US 2005/0134919 A1    Jun. 23, 2005

(51) Int. Cl.
*H04N 1/405* (2006.01)
(52) U.S. Cl. .................. 358/3.03; 358/3.06; 358/3.05; 358/534; 358/3.26; 358/1.9; 358/3.01; 382/252; 382/260
(58) Field of Classification Search ............... 358/3.03, 358/3.06, 3.05, 534, 3.26, 1.9, 3.01; 382/251–252, 382/260–265
See application file for complete search history.

(56) References Cited

U.S. PATENT DOCUMENTS

| 5,050,000 | A | 9/1991 | Ng |
| 5,172,247 | A | 12/1992 | Ghaderi |
| 5,337,160 | A | 8/1994 | Jones |
| 5,848,224 | A | 12/1998 | Nhu |
| 5,870,503 | A | 2/1999 | Kumashiro |
| 6,014,227 | A | 1/2000 | Norton |
| 6,437,877 | B1 | 8/2002 | Takei |
| 6,442,300 | B1 | 8/2002 | Hains |
| 6,556,214 | B1 | 4/2003 | Yamada et al. |
| 6,956,675 | B2 * | 10/2005 | Nose ......................... 358/3.03 |
| 2004/0196478 | A1 * | 10/2004 | Imafuku et al. ............. 358/1.9 |

* cited by examiner

*Primary Examiner*—King Y. Poon
*Assistant Examiner*—Quang N. Vo
(74) *Attorney, Agent, or Firm*—Taylor & Aust P.C.

(57) ABSTRACT

The present invention relates to error diffusion logic in which three partial diffusion error values are produced in a pipelined manner and then summed together when the last partial error value is produced. The resulting summed error can be used to adjust a target pixel in a sequence of pixels or stored in a buffer until further corresponding partial error is produced for adjusting the target pixel.

29 Claims, 4 Drawing Sheets

CALCULATING ERROR DIFFUSION ERRORS TO MINIMIZE MEMORY ACCESSES

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to image processing and, more specifically, to error diffusion systems and methods used in halftoning for output toga printer or other display device.

2. Description of the Related Art

Imaging devices, such as printers and displays, are typically capable of outputting a certain number of colors at each location output. This capability is referred to as the device's "bit-depth."

Halftoning of image data is required whenever the output image bit-depth is smaller than the input image data bit-depth. This situation occurs most often in devices such as printers or multifunction devices (MFDs) where there are most commonly only two possibilities at each physical location: leave location unprinted or put toner/ink at location. In addition to MFDs, halftoning is also often needed for outputting image data to computer displays, such as cathode ray tube (CRT) or liquid crystal display (LCD) monitors.

As an example, consider a MFD that includes a scanner portion and a printer portion. Some such devices can include a monitor portion for previewing images scanned via the scanner portion or otherwise received from another source such as a computer network connection. The scanner can typically create image scans in various reproductive formats, such as 24 bit RGB, 32 bit CMYK, 8 bit gray, or binary CMYK. The image with multiple levels of gray or color (i.e., a continuous tone image) is rendered from the scanner to the printer in a halftoning process.

To perform optimally, a MFD may require that the scanner generate binary, monochrome, or color data. However, the binary data must include sufficient compensation to enable the printer portion to meet standard copy quality requirements. This function is usually accomplished by building in static color tables or transfer functions for the scanner portion and the printer portion and further modifying the scanned image. Accordingly, autonomous scanning stations may have standard color profiles that a user may select. In addition, vendors may provide software and/or hardware solutions that serve to calibrate the colors and/or gray shading of a scanned image.

Most halftoning methods are spatially based, i.e., they use the human visual system spatial averaging properties that average over a neighborhood of bi-level pixels to provide a sensation of intermediate color level. Typical steps in a rendering process include converting the resolution or DPI (dots per inch) of the digital image to the desired display or print resolution, converting the digital image color space to the display device colorant color space (e.g., RGB to CMYK), and converting the display device colorants to display device dot data. The architecture of the processing element or elements performing this task should produce a high quality transformation that is pleasing to the eye from the digital image to display device while providing high performance at the lowest cost and size possible. Therefore, the algorithms used for each step must be carefully selected and implemented with these goals in mind.

A well-known method for converting the display device colorants to display device dot data is known as error diffusion. The method is believed to owe its origins to Floyd and Steinberg, and is therefore commonly referred to in the art as Floyd-Steinberg error diffusion. A description of this process is provided herein for illustrative purposes with reference to FIG. 1. The squares 140 represent the pixels of an input image. Pixels are processed sequentially in a raster-scan manner, with pixels processed one by one, left to right, continuing in this manner from one row or line to the next line below. The shaded squares 160 represent pixels that have not been processed as yet. Square 110 is an example of a pixel determined to require placement of a dot; square 120 is an example of a pixel determined not require placement of a dot. Square 130 represents the pixel under current examination by the error diffusion process.

As the process of examining pixels in a raster-scan manner progresses, a pixel value associated with the current pixel is compared against a threshold value to determine the output corresponding to the current pixel (dot placement or no dot placement). For instance, assume that the pixel value is in the range of 0-255 as would often be the case for a 256 color gray-scale input image (assuming 0 represents black and 255 represents white), if a threshold value is 127 for a particular pixel, an output of dot placement would occur if the pixel value were 127 or less, and an output of no dot placement would occur if the pixel value were above 127. Next an error associated with this pixel is calculated; the error is calculated by subtracting the particular pixel value from the pixel value associated with the output. To continue with the example, the error for the pixel would be pixel value minus zero if the output were dot placement and would be pixel value minus 255 if the output were no dot placement. The error is then distributed to neighboring pixels below the current pixel and in front of the current pixel in the direction of error diffusion processing. The neighborhood of pixels to which error is diffused varies depending upon implementation. A common neighborhood of pixels includes the pixel immediately in front of the current pixel (i.e., square 170) and the three pixels immediately below the current pixel (i.e., squares 182, 184 and 186). The calculated error is diffused to the neighborhood according to a weighting scheme that attributes a portion of the error to each pixel in the neighborhood; a typical weighing distributes $7/16$ of the error to the pixel ahead (i.e., square 170), $3/16$ to the pixel below and behind (i.e., square 182), $5/16$ to the pixel immediately below (i.e., square 184) and $1/16$ to the pixel below and ahead (i.e., square 186).

It can be seen that to implement Floyd-Steinberg error diffusion in electronic logic (i.e., some combination of hardware, software or firmware) that operates in a raster-scan manner, it is necessary to accumulate or otherwise sum the error portions that are to be applied to a particular pixel. For example, in some known implementations, the $1/16$ error portion, $3/16$ error portion, and $5/16$ error portion are stored in memory locations as they are calculated and then summed together and applied to the pixel after the last one of the error portions is calculated. Such an implementation requires several memory write and read operations (perhaps as many as six) to correct each pixel. Another known implementation is to employ accumulators corresponding to each pixel to which the calculated error is to be applied. As the error portion contributions to the total error are calculated from neighboring pixels, they are summed or added together in the accumulator with previously calculated error portion contributions. Only after all contributions from neighboring pixels have been added is the resulting total applied to the pixel to which the accumulator corresponds. Using hardware accumulators instead of reading and writing memory locations can provide efficiency advantages, but accumulators still require multiple clock cycles to perform these operations. It would be desirable to provide error diffusion logic that not only minimizes the number of memory access but also minimizes the number of clock cycles to produce a calculated error value.

SUMMARY

The present invention relates to error diffusion logic in which at least two partial diffusion error values are produced in a pipelined manner and then summed together when the last partial error value is produced. The resulting summed error can be used to adjust the pixel to which it corresponds or stored in a buffer until further corresponding partial error is produced. For example, in an exemplary embodiment of the invention in which a pixel receives three partial error contributions from the pixels on the line above it, on each of three sequential clock cycles one of the three partial error contributions is latched, and then they are added together or summed as soon as the last of the three is latched. The three partial error contributions can be, for example, the $3/16$ error, the $5/16$ error and the $1/16$ error, and their sum can be stored in a buffer until the $7/16$ error is produced on the next line.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed. By modifying the number of error cells, error weightings and counters appropriately other error distribution schemes can be implemented using the techniques described.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

In an exemplary embodiment, the present invention relates to digital image processing in a multifunction product that performs scanning and printing. Nevertheless, in other embodiments the invention can relate to digital image processing in any other suitable machine, device or system. The error diffusion logic described below can be included in an application-specific integrated circuit (ASIC) or other suitable hardware, software or firmware, or combination thereof. The error diffusion logic can be used in any suitable image pipeline or processing system. An example is that which includes the error diffusion processing elements described in co-pending application Ser. No. 10/414,854, entitled "SYSTEMS AND METHODS FOR ERROR DIFFUSION," filed Apr. 16, 2003, and incorporated herein in its entirety by this reference. The error diffusion processing elements described in this co-pending application can comprise the error diffusion logic described below.

Figure 1:
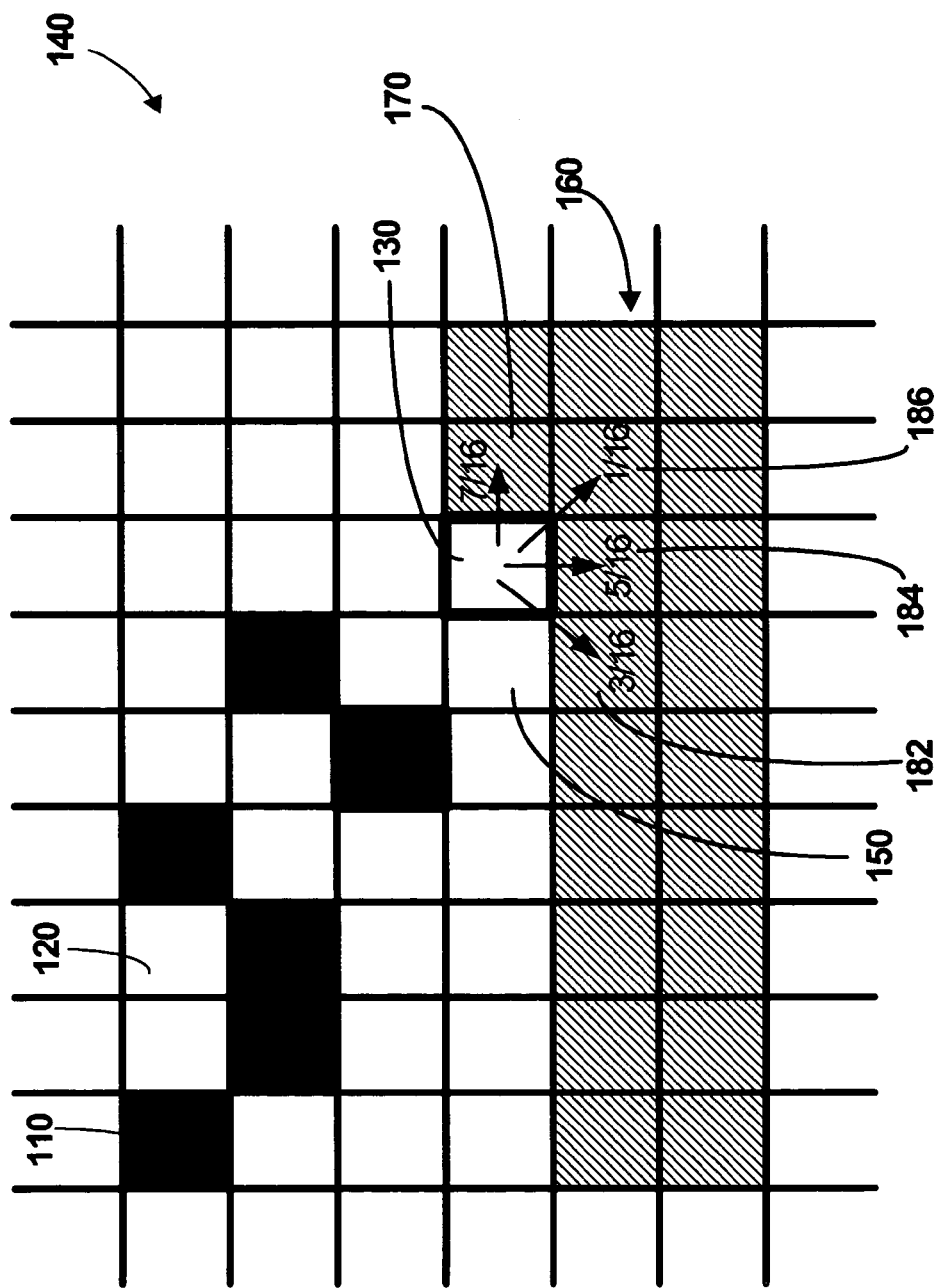
FIG. 1 is a diagram depicting a partially processed digital image undergoing error diffusion.

As described above with regard to FIG. 1, pixels are processed sequentially in a raster-scan manner, one by one, from one edge to the opposite edge, continuing in this manner from the last pixel of a line to the first pixel of the next line below it, from top to bottom. The pixels can be processed from left to right or from right to left. Each pixel is compared with a predetermined threshold value to determine an error value. In an exemplary embodiment of the invention, up to four partial errors are calculated for the pixel being processed and then distributed to adjacent pixels. In the exemplary embodiment, a partial error contribution of $3/16$ of the error value is to be distributed to the pixel down and behind the pixel being processed, another partial error contribution of $5/16$ of the error value is to be distributed to the pixel directly down or below the pixel being processed, another partial error contribution of $1/16$ of the error value is to be distributed to the pixel down and forward of the pixel being processed, and another partial error contribution of $7/16$ of the error value is to be distributed to the pixel forward of the pixel being processed. It can thus be seen with regard to FIG. 2 that, except for the first row of pixels and except for the first and last pixels of a line, each pixel receives a contribution from the three adjacent pixels above it: the pixel above and behind (the $1/16$ error), the pixel directly above (the $5/16$ error), and the pixel above and ahead (the $3/16$ error). These contributions to the pixel are indicated by the solid-line arrows in FIG. 2 at square 184; the dashed-line arrows represent other such contributions in the adjacent pixels at squares 182 and 186. Stated another way, the first of three sequential pixels on the prior line (i.e., square 150) contributes the $1/16$ partial error contribution to a target pixel (i.e., square 184), the second of the three sequential pixels on the line (i.e., square 130) contributes the $5/16$ partial error contribution to the target pixel (i.e., square 184), and the third of the three sequential pixels on the line (i.e., square 170) contributes the $3/16$ partial error contribution to the target pixel (i.e., square 184).

The error diffusion logic described below latches the first ($1/16$) partial error contribution when the pixel contributing it (i.e., square 150) is selected for processing, then on the next clock cycle the logic latches the second ($5/16$) partial error contribution when the pixel contributing it (i.e., square 130) is selected for processing, and finally on the next clock cycle the logic latches the third ($3/16$) partial error contribution when the pixel contributing it (i.e., square 170) is selected for processing. On that last clock cycle, the three latched partial error contributions are added together or summed to produce a summed error that is then stored or buffered until the next line. In this example, when the target pixel (i.e., square 184) is selected on that next line, the summed error is retrieved, added to the 7/16 error contributed by the pixel immediately before the target pixel (i.e., square 182), and the resulting whole error is finally applied to the target pixel. The summed error (i.e., the sum of the first, second and third partial error contributions) is produced on each clock cycle in a pipelined manner that advantageously promotes efficient operation and minimal memory accesses.

For the pixels adjacent the edges or borders, the error diffusion logic knows when an edge pixel is encountered and provides an appropriate partial error contribution to be used in the summing calculation. In these cases only two partial error contributions are used. For example, assume that square 150 is the first pixel in the line. It would contribute the 5/16 error value to square 182. Square 130 would contribute the 3/16 error value to square 182. Similarly, for example assume that square 170 is the last pixel in the line of pixels. It would contribute the 5/16 error value to square 186. Square 130 would contribute the 1/16 error value to square 186.

Figure 3:
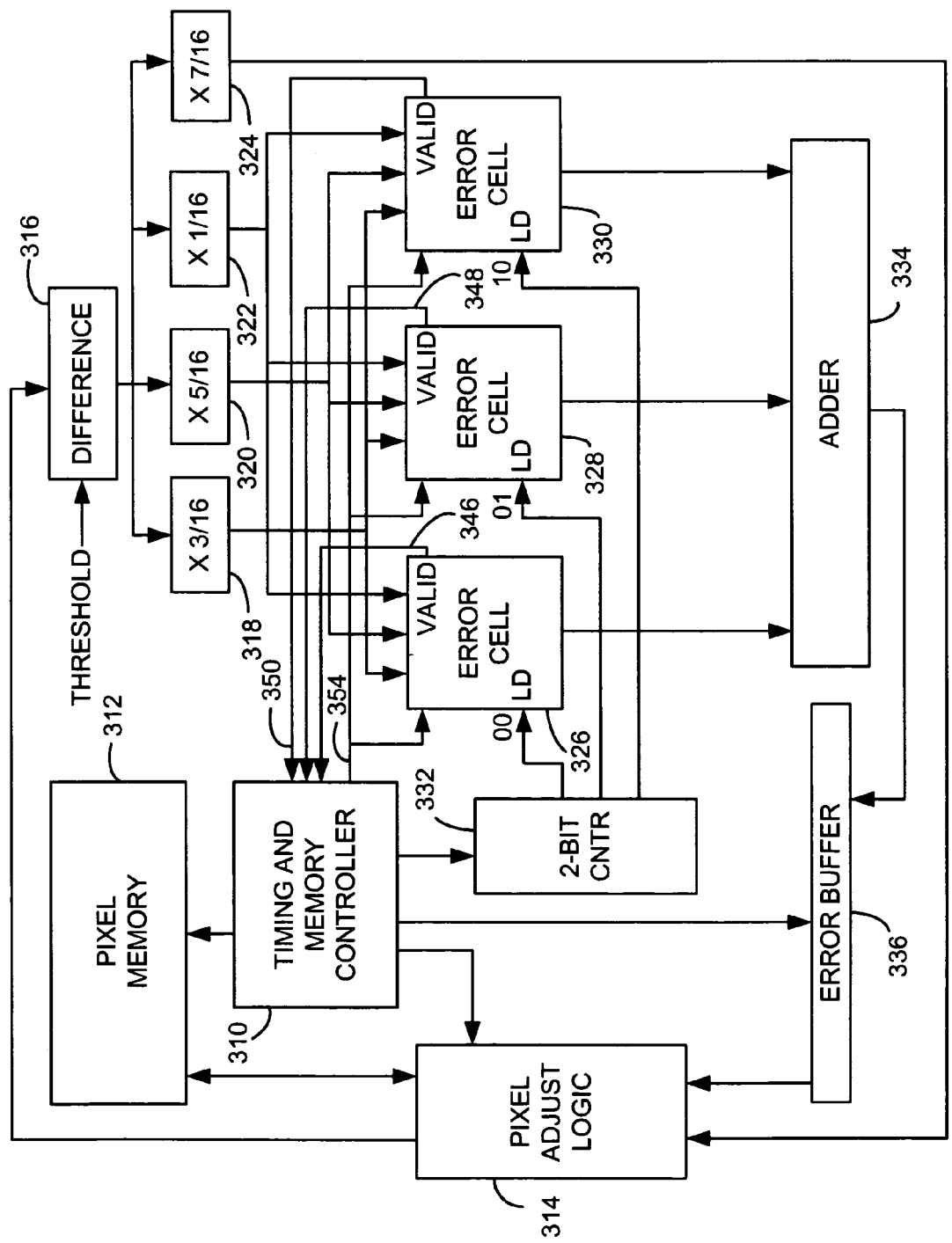
FIG. 3 is a block diagram of an error diffusion circuit.

As illustrated in FIG. 3, in the exemplary embodiment of the invention, the system 300 includes: a timing and memory controller 310 that controls a pixel memory 312 in which the image is stored; a pixel adjuster 314 that applies the calculated error to the target pixel; a difference circuit 316 that calculates the difference or error value between the adjusted pixel selected for processing and the predetermined threshold value; four calculation elements 318, 320, 322 and 324 that produce the back-and-down error value (e.g., 3/16 of the error value), the down error value (e.g., 5/16 of the error value), the down-and-forward error value (e.g., 1/16 of the error value) and the forward error value (e.g., the 7/16 of the error value), respectively; three error cell circuits 326, 328 and 330 that are sequentially loaded with the partial error contributions under control of timing and memory controller 310 and a 2-bit counter 332, and an adder 334 under the control of the timing and memory controller 310 that receives the partial error contributions from each of the error cell circuits 326, 328 and 330 and provides the sums of the partial error contributions to an error buffer 336 for storage. Each error cell circuit 326, 328, and 330 also has a valid signal output 346, 348, and 350 that can be asserted, respectively, that is input to timing and memory controller 310. It should be noted that, in embodiments of the invention in which the error diffusion logic is physically embodied in an ASIC, pixel memory 312 and some or all of error buffer 336 can be external to the ASIC. It should also be noted that, in other embodiments, the above-described error diffusion logic elements can be combined with each other or with other elements in any suitable manner. For example, calculation elements 318, 320, 322 and 324 can share bit-shift circuitry or other circuitry, or share circuit elements with difference circuit 316.

Pixel adjust logic 314 sequentially retrieves pixels from memory 312 and adds them with the output of error buffer 336. Furthermore, the 7/16 partial error contribution produced by calculation element 324 for the pixel immediately before the target pixel is added. Under the control of timing and memory controller 310, the adjusted pixels are input to difference circuit 316 in a pipelined manner. On each clock cycle, one pixel is retrieved or selected from memory 312 and input to the error diffusion circuitry. Generation of a master clock signal for this error diffusion logic is not shown for purposes of clarity. Difference circuit 316 calculates the difference or error between the selected pixel and the predetermined threshold value, which can be any suitable value as well-understood by persons skilled in the art to which the invention relates.

The 3/16 partial error contribution produced by calculation element 318 is provided to each of error cell circuits 326, 328 and 330. Similarly, the 5/16 partial error contribution produced by calculation element 320 and the 1/16 partial error contribution produced by calculation element 322 is provided to each of error cell circuits 326, 328 and 330. Counter 332 counts up from zero with each clock edge, and produces a first load signal ("LD") sent to error cell 326 when the counter value is zero (binary "00"), a second load signal sent to error cell 328 when the counter value is one (binary "01"), and a third load signal sent to error cell 330 when the counter value is two (binary "10").

Figure 4:
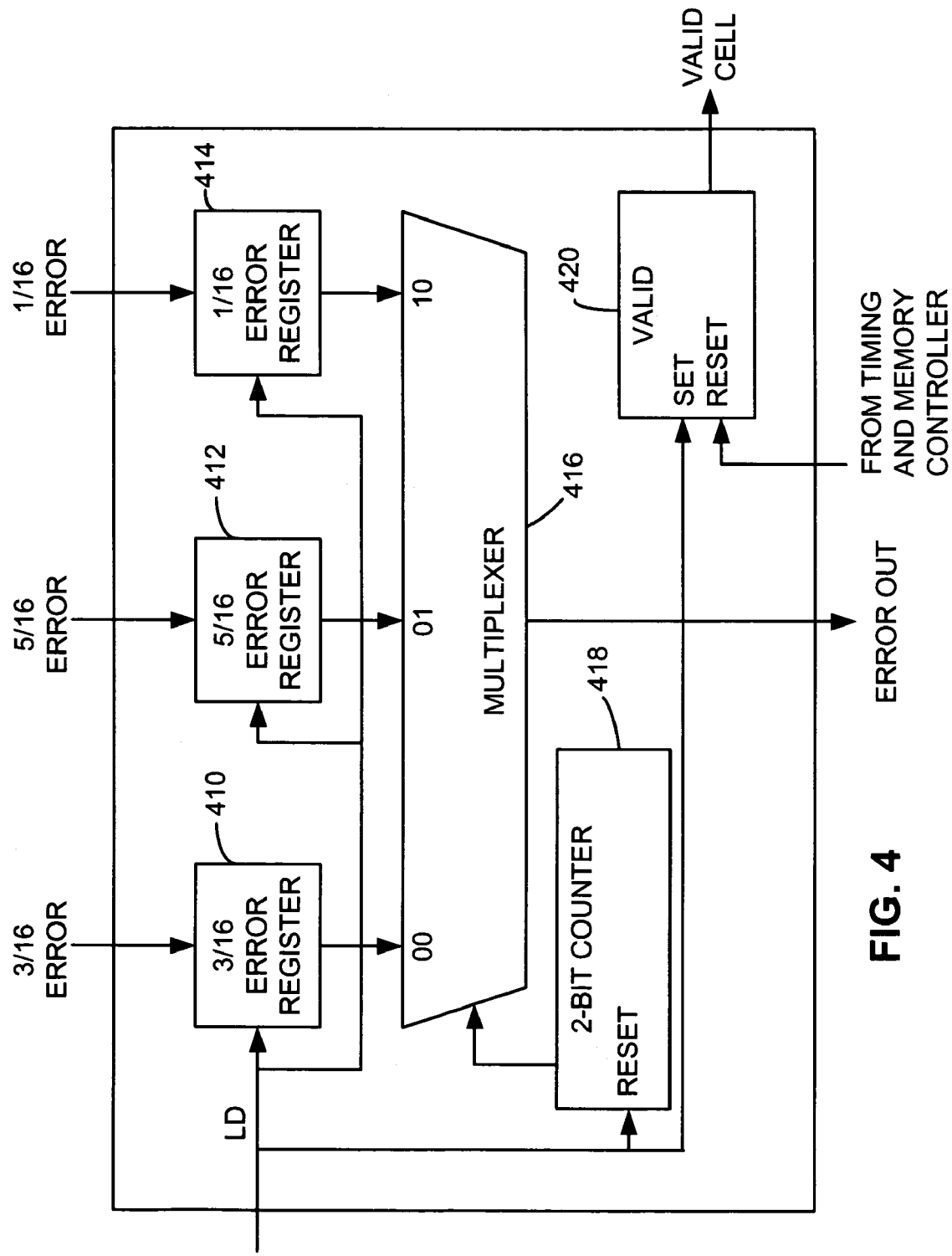
FIG. 4 is a block diagram of an error cell used in the error diffusion circuit of FIG. 3.

As illustrated in FIG. 4, each of error cell circuits 326, 328 and 330 comprises three error registers 410, 412 and 414, a multiplexer 416, a 2-bit counter 418, and a validation circuit 420. Assertion of the corresponding first, second or third load signal causes error registers 410, 412, and 414 to load the partial error contributions. In other words, when the load signal is asserted, error register 410 latches the 3/16 partial error contribution, error register 412 latches the 5/16 partial error contribution, and error register 414 latches the 1/16 partial error contribution.

The partial error contributions latched in registers 410, 412 and 414 are input to multiplexer 416. Counter 418 is incremented on each clock cycle and is reset to zero by the same load signal that causes registers 410, 412 and 414 to load. The counter value causes multiplexer 416 to select one of its three inputs. When the counter value is zero, the 3/16 partial error contribution latched in register 410 is selected and output from multiplexer 416; when the counter value is one, the 5/16 partial error contribution latched in register 412 is selected and output from multiplexer 416; and when the counter value is two, the 1/16 partial error contribution latched in register 414 is selected and output from multiplexer 416. Validation circuit is 420, such as an R/S flip flop, asserts a valid signal (346, 348, or 350) when the load signal is received at the error cell. It is assumed that registers 410, 412 and 414 have been loaded with the partial error contributions received from its respective calculation element 318, 320, or 324. Valid signals 346, 348, and 350 are output from error cells 326, 328 and 330, respectively and is an input to the timing and memory controller 310. The validation circuit in each error cell is reset at the end of each raster line by the timing and memory controller 310 via reset signal 354. The output of multiplexer 416 represents the output of the error cell circuit 326, 328, or 330.

Referring again to FIG. 3, adder 334 adds or sums the outputs of error cell circuits 326, 328 and 330 together. For the pixels at the beginning and end of a line, the output of only two of the three error cells (either error cells 326 and 328 or errors cells 328 and 330) are needed to process a valid addition. Therefore, when at least two of the three sequentially produced valid signals or all three of the sequentially produced valid signals are asserted by error cells 326, 328 and 330, respectively (i.e. the two valid signals of error cells 326 and 328 or the two valid signals of error cells 328 and 330), timing and memory controller 310 causes the output of adder 334 to be stored in error buffer 336. For pixels in the line of pixels that are intermediate the first and last pixels, all three valid signals for error cells 326, 328 and 330 will be asserted during error processing and their respective partial error contributions will be added together.

Figure 2:
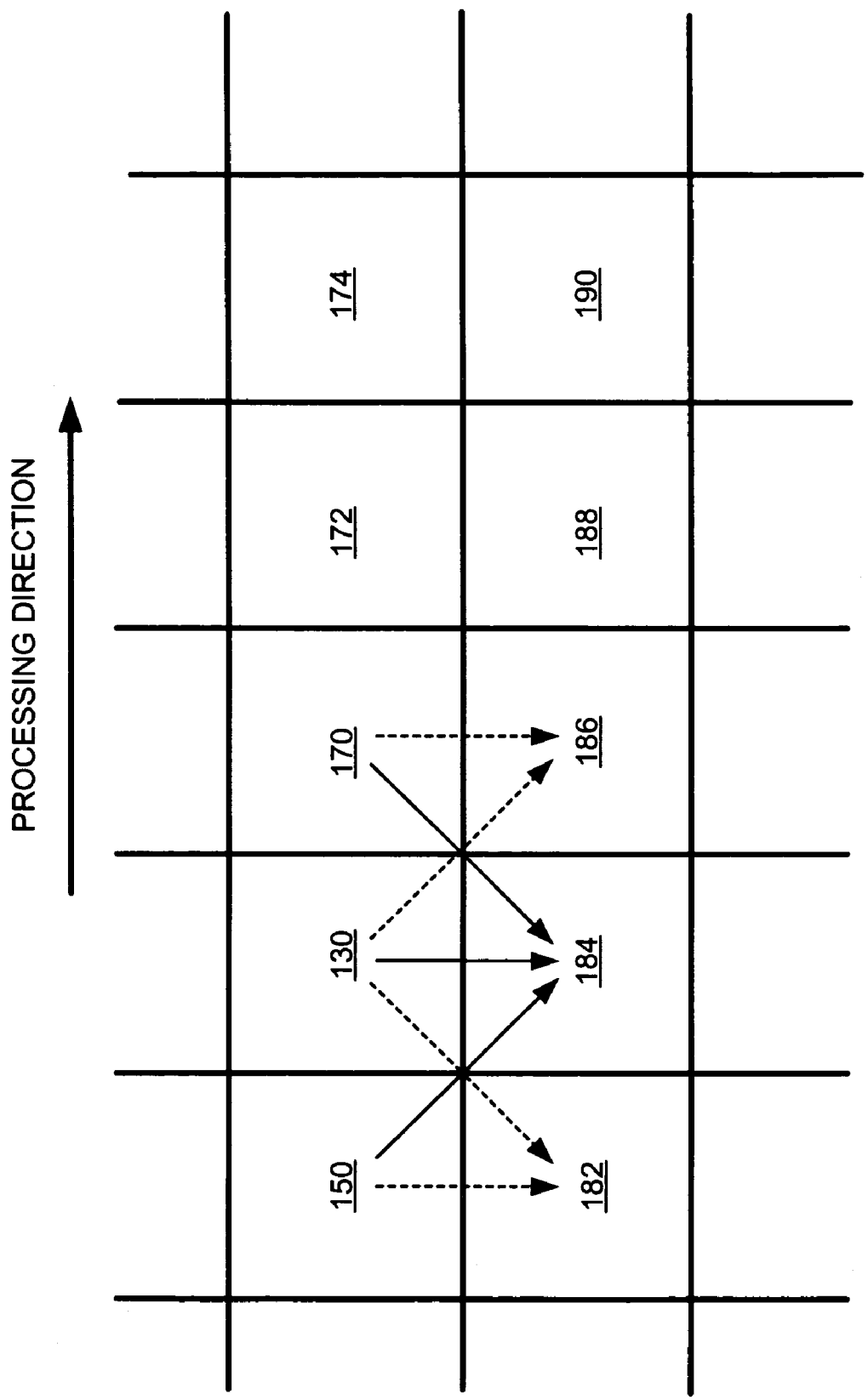
FIG. 2 illustrates an enlarged portion of FIG. 1.

In summary, use of three error cells 326, 328 and 330 enables them to be loaded with the partial error contributions of square 150, 130, and 170 in the manner indicated by the solid arrows in FIG. 2. Cells 326, 328 and 330 are loaded with three sequential pixels' partial error contributions on sequential clock edges. Once error contributions of the third pixel (i.e. square 170) have been loaded, counter 418 (FIG. 4) in each of the error cells 326, 328 and 330 will have the correct value to cause multiplexer 416 to select the appropriate partial error contribution to be output to adder 334, whether it be down-and back, directly down, or down-and-forward, as indicated by the solid arrows in FIG. 2. For example, if error cell 330 had been most recently loaded with the pixel corresponding to square 170, its counter value would be zero and would direct multiplexer 416 to select the down-and-back error contribution (the $3/16$ error). Given that error cell 328 was loaded on the previous clock cycle before that which caused error cell 330 to load, its counter value would be one and would direct multiplexer 416 to select the directly down error contribution (the $5/16$ error). Error cell 326 was loaded two cycles before error cell 330, its counter value would be two and would direct multiplexer 416 to select the down-and-forward error contribution ($1/16$ error). Using the above-described pipelined approach in error diffusion logic allows for error calculation on each new clock edge.

While the pipelined error diffusion logic is described using four partial error contributions, the error diffusion logic can be used with other error distribution schemes by using fewer or more pixels, fewer or additional error cells and calculating elements and changing the counters and error calculation weighting to reflect the desired error distribution scheme for the number of pixels chosen for the error distribution scheme.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for performing error diffusion on a sequence of pixels in an image comprised of lines of pixels, comprising the steps of:
    sequentially selecting at least two pixels in the sequence of pixels;
    sequentially calculating for each of the at least two pixels a partial error contribution to be applied to a target pixel, each of the at least two pixels in a predetermined spatial relationship with the target pixel;
    latching each of the sequentially calculated partial error contributions;
    upon calculation of the last sequential partial error contribution, providing the sequentially calculated error contributions to an adder for summing;
    storing the sum of the sequentially calculated partial error contributions in an error buffer memory;
    selecting the target pixel as part of the sequence;
    retrieving the sum of the sequentially calculated partial error contributions from the error buffer memory; and
    applying the sum of the sequentially calculated partial error contributions to the selected target pixel.

2. The method of claim 1 further comprising:
    determining the position of the selected target pixel in its line of pixels;
    upon determining that said position is other than the first position or last position, sequentially selecting at least one additional pixel in the sequence of pixels and sequentially calculating for such at least one additional pixel a partial error contribution to be applied to the target pixel, said at least one additional pixel having a predetermined spatial relationship with the target pixel.

3. The method of claim 2 wherein the spatial relationships between the at least two pixels and the target pixel is that the target pixel is one pixel space ahead of and one line below the first of the at least two pixels and is one line below the second of the at least two pixels and the spatial relationship between the at least one additional pixel and the target pixel is that the target pixel is one pixel space behind and one line below the at least one additional pixel.

4. The method of claim 3 wherein the partial error contributions of the at least two pixels are $1/16$ of an error corresponding to the first pixel and is $5/16$ of an error corresponding to the second pixel and the partial error contribution of the at least one additional pixel is $3/16$ of an error corresponding to the at least one additional pixel.

5. The method of claim 1 further comprising:
    determining that the target pixel is the first pixel in a line of pixels wherein the spatial relationships between the at least two pixels and the target pixel is that the target pixel is one line below the first of the at least two pixels and is one pixel space behind and one line below the second of the at least two pixels.

6. The method of claim 5 wherein the partial error contributions of the at least two pixels are $5/16$ of an error corresponding to the first pixel and $3/16$ of an error corresponding to the second pixel.

7. The method of claim 1 further comprising:
    determining that the target pixel is the last pixel in the line of pixels wherein the spatial relationships between the at least two pixels and the target pixel is that the target pixel is one pixel space ahead and one line below the first of the at least two pixels and is one line below the second of the at least two pixels.

8. The method of claim 7 wherein the partial error contributions of the at least two pixels are $1/16$ of an error corresponding to the first pixel and $5/16$ of an error corresponding to the second pixel.

9. The method of claim 2 further comprising:
    sequentially selecting a further at least one additional pixel in the sequence of pixels and sequentially calculating for such further at least one additional pixel a partial error contribution to be applied to the target pixel, the further at least one additional pixel having a predetermined spatial relationship with the target pixel.

10. The method of claim 9 wherein the spatial relationships between the at least two pixels and the target pixel is that the target pixel is one pixel space ahead of and one line below the first of the at least two pixels and is one line below the second of the at least two pixels, the spatial relationship between the at least one additional pixel and the target pixel is that the target pixel is one pixel space behind and one line below the at least one additional pixel and the spatial relationship of the further at least one additional pixel with the target pixel is that target pixel in one pixel space ahead of and in the same line as the further at least one additional pixel.

11. The method of claim 10 wherein the partial error contributions of the at least two pixels are $1/16$ of an error corresponding to the first pixel and is $5/16$ of an error corresponding to the second pixel, the partial error contribution of the at least one additional pixel is $3/16$ of an error corresponding to the at least one additional pixel and the partial error contribution of the further at least one additional pixel is 7/16 of an error corresponding to the further at least one additional pixel.

12. The method of claim 1 further comprising:
determining the position of the selected target pixel in its line of pixels;
upon determining that said position is other than the first position or last position, sequentially selecting at least two additional pixels in the sequence of pixels and sequentially calculating for each of such at least two additional pixels a partial error contribution to be applied to the target pixel, said at least two additional pixels each having a predetermined spatial relationship with the target pixel.

13. The method of claim 12 wherein the spatial relationships between the at least two pixels and the target pixel is that the target pixel is one pixel space ahead of and one line below the first of the at least two pixels and is one line below the second of the at least two pixels, and the spatial relationship between the at least two additional pixels and the target pixel is that the target pixel is one pixel space behind and one line below the first of the at least two additional pixels and the spatial relationship of the second of the at least two additional pixels with the target pixel is that target pixel in one pixel space ahead of and in the same line as the second of at least two additional pixels.

14. The method of claim 13 wherein the partial error contributions of the at least two pixels are 1/16 of an error corresponding to the first pixel and is 5/16 of an error corresponding to the second pixel and the partial error contribution of the at least two additional pixels are 3/16 of an error corresponding to the first of at least two additional pixels and 7/16 of an error corresponding to the second of the at least two additional pixels.

15. A method for performing error diffusion on a sequence of pixels in an image comprised of lines of pixels, comprising the steps of:
selecting a first pixel in the sequence, the first pixel having a first partial error contribution to a total error to be applied to a target pixel, the first pixel and target pixel being in a predetermined spatial relationship with each other;
calculating the first partial error contribution by the first pixel to the target pixel;
latching the first partial error;
selecting a second pixel in the sequence, the second pixel having a second partial error contribution to the total error to be applied to the target pixel to be corrected, the second pixel and target pixel being in a predetermined spatial relationship with each other;
calculating the second partial error contribution by the second pixel to the target pixel;
latching the second partial error;
selecting, when the target pixel is not at the beginning or end of a line of pixels, a third pixel in the sequence, the third pixel having a partial error contribution to the total error to be applied the target pixel to be corrected, the third pixel and target pixel being in a predetermined spatial relationship with each other;
calculating the third partial error contribution by the third pixel to the target pixel;
upon calculating the third partial error contribution, providing the first, second and third partial error contributions to an adder;
storing a sum of the first, second and third partial error contributions in an error buffer memory;
selecting the target pixel as part of the sequence;
retrieving the sum of the first, second and third partial error contributions from the error buffer memory; and
applying the sum of the first, second and third partial error contributions to the selected target pixel.

16. The method claimed in claim 15 further comprising:
determining that the selected target pixel is either at the beginning or the end of the line of pixels;
upon calculating the second partial error contribution, providing the first and second partial error contributions to the adder;
storing a sum of the first and second partial error contributions in the error buffer memory;
retrieving the sum of the first and second partial error contributions from the error buffer memory; and
applying the sum of the first and second partial error contributions to the selected target pixel.

17. The method claimed in claim 16 wherein:
when the target pixel is the first pixel in the line of pixels, the spatial relationship between the first pixel and the target pixel is that that target pixel is one line directly below the first pixel and the spatial relationship between the second pixel and the target pixel is that the target pixel is one pixel space behind and one line below the second pixel and target pixel; and
when the target pixel is the last pixel in the line of pixels, the spatial relationship between the first pixel and the target pixel is that that target pixel is one pixel space ahead and one line below the first pixel and the spatial relationship between the second pixel and the target pixel is that the target pixel is one line directly below the second pixel.

18. The method claimed in claim 15 wherein the spatial relationship between the first pixel and target pixel is that the target pixel is one pixel space ahead of and one line below the first pixel.

19. The method claimed in claim 15 wherein the spatial relationship between the second pixel and target pixel is that the target pixel is one line directly below the second pixel.

20. The method claimed in claim 15 wherein the spatial relationship between the third pixel and target pixel is that the target pixel is one pixel space behind and one line below the third pixel.

21. The method claimed in claim 15 wherein:
the first partial error contribution is 1/16 of an error corresponding to the first pixel;
the second partial error contribution is 5/16 of an error corresponding to the second pixel; and
the third partial error contribution is 3/16 of an error corresponding to the third pixel.

22. The method claimed in claim 15 further comprising the steps of:
selecting a fourth pixel in the sequence, the fourth pixel having a fourth partial error contribution to the total error to be applied the target pixel, the fourth pixel and target pixel being in a fixed, predetermined spatial relationship with each other;
calculating a fourth partial error contribution by the fourth pixel to the target pixel; and
upon applying the sum of the first, second and third partial error contributions to the selected target pixel, also applying the fourth partial error contribution to the target pixel.

23. The method claimed in claim 22 wherein the spatial relationship between the fourth pixel and target pixel is that the target pixel is one pixel space ahead of and in the same line as the fourth pixel.

24. The method claimed in claim 23 wherein:
the first partial error contribution is $1/16$ of an error corresponding to the first pixel;
the second partial error contribution is $5/16$ of an error corresponding to the second pixel;
the third partial error contribution is $3/16$ of an error corresponding to the third pixel; and
the fourth partial error contribution is $7/16$ of an error corresponding to the fourth pixel.

25. A system for performing error diffusion on a sequence of pixels, comprising:
pixel input logic for sequentially producing selected pixels of the sequence;
partial error calculation logic for calculating, in response to each selected pixel, first, second and third partial error contributions to the total error to be applied to a target pixel to be corrected;
timing logic for sequentially asserting first, second and third load signals;
a first error cell circuit for latching the first, second and third partial error contributions of a first selected pixel in response to assertion of the first load signal and sequentially selecting the latched first, second and third partial error contributions after assertion of the first load signal;
a second error cell circuit for latching the first, second and third partial error contributions of a second selected pixel in response to assertion of the second load signal and sequentially selecting the latched first, second and third partial error contributions after assertion of the second load signal;
a third error cell circuit for latching the first, second and third partial error contributions of a third selected pixel in response to assertion of the third load signal and sequentially selecting the latched first, second and third partial error contributions after assertion of the third load signal;
an adder for summing the selected ones of the latched first, second and third partial error contributions of the selected pixels, wherein the sum of the selected ones of the latched first, second and third partial error contributions output by the adder is stored in an error buffer memory; and
pixel adjustment logic for applying the stored sum of the selected ones of the first, second and third partial error contributions to the target pixel when the target pixel is selected by the pixel input logic.

26. The system claimed in claim 25 further comprising validation logic to ensure that prior to summing in the adder at least two sequential error cells of the first, second and third error cell circuits have latched partial error contributions following assertion of the load signal for the second of the two sequential error cells.

27. The system claimed in claim 25 further comprising target pixel location logic for determining the position of the target pixel in the sequence of pixels and validation logic to ensure that prior to summing in the adder the first, second and third error cell circuits each have latched partial error contributions following assertion of the load signal for the third of the error cells when the target pixel is determined to be intermediate the first and last pixel in the sequence of pixels.

28. The system claimed in claim 25 further comprising target pixel location logic for determining the position of the target pixel in the sequence of pixels and validation logic to ensure that prior to summing in the adder at least two sequential error cells of the first, second and third error cell circuits each have latched partial error contributions following assertion of the load signal for the last of the two sequential error cells when the target pixel is determined to be either the first or the last pixel in the sequence of pixels.

29. An application-specific integrated circuit (ASIC) comprising the system claimed in claim 25.

* * * * *